United States Patent
Hayasaka

(10) Patent No.: US 7,120,878 B2
(45) Date of Patent: Oct. 10, 2006

(54) OPERATION CONTROL DEVICE FOR IMPARTING FORCE TO JOYSTICK KNOB

(75) Inventor: Satoshi Hayasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 847 days.

(21) Appl. No.: 10/321,959

(22) Filed: Dec. 16, 2002

(65) Prior Publication Data

US 2003/0117372 A1    Jun. 26, 2003

(30) Foreign Application Priority Data

Dec. 25, 2001    (JP) ............................. 2001-391904

(51) Int. Cl.
*G06F 15/00*    (2006.01)
*G06F 13/00*    (2006.01)

(52) U.S. Cl. .................... 715/834; 715/833; 345/161

(58) Field of Classification Search ............... 715/754, 715/832, 833, 834; 345/159, 160, 161, 164, 345/166, 167
See application file for complete search history.

(56) References Cited

U.S. PATENT DOCUMENTS

| 5,213,327 | A | * | 5/1993 | Kitaue ........................ 463/38 |
| 6,636,197 | B1 | * | 10/2003 | Goldenberg et al. ........ 345/156 |
| 2002/0196233 | A1 | * | 12/2002 | Kataoka et al. ............. 345/161 |

* cited by examiner

*Primary Examiner*—Cao (Kevin) Nguyen
(74) *Attorney, Agent, or Firm*—Brinks Hofer Gilson & Lione

(57) ABSTRACT

An operation control device is provided with: a manually-operating unit having a joystick knob capable of intermittently operating in two directions; a knob displacement detector for generating knob displacement information of the knob; a controller for converting an amount of knob displacement obtained from the knob displacement information into an amount of force; and a force imparting unit for imparting a force corresponding to the amount of force to the knob when the knob is operated, wherein when the knob passes through one or more intermittent positions from a starting position to be operated to a terminating position, the controller sets in such a manner that an amount of force at one or more intermittent positions is increased in stages from the starting position side toward the terminating position side.

3 Claims, 4 Drawing Sheets

WHEN OPERATING IN DIRECTION FROM
CHARACTER 14 TO CHARACTER 11

WHEN OPERATING IN DIRECTION FROM
CHARACTER 11 TO CHARACTER 14

WHEN OPERATING IN DIRECTION FROM
CHARACTER 14 TO CHARACTER 11

WHEN OPERATING IN DIRECTION FROM
CHARACTER 11 TO CHARACTER 14

FIG. 4
PRIOR ART
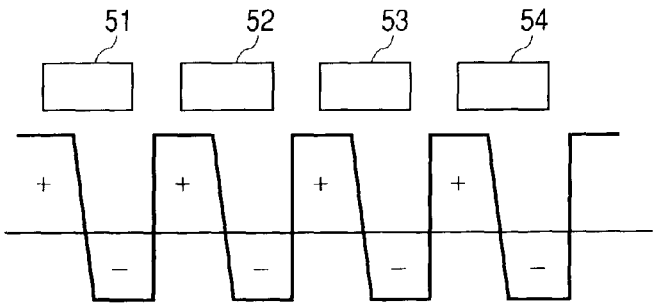
FIG. 5A
PRIOR ART
FIG. 5B
PRIOR ART
FIG. 5C
PRIOR ART

OPERATION CONTROL DEVICE FOR IMPARTING FORCE TO JOYSTICK KNOB

BACKGROUND OF THE INVENTION

1. Field of the Invention

The present invention relates to an operation control device, and more particularly to an operation control device capable of preventing, when operating a joystick knob from a starting position to a terminating position, the joystick knob from going too far even when it is operated in one stroke between the starting position and the terminating position which are spaced considerably apart from each other.

2. Description of the Related Art

Generally, the operation control device is equipped with a manually-operating unit having a joystick knob operable at least in one direction, and when operating the joystick knob from a starting position to a terminating position, there is performed an operation for passing through one or more selective positions located between the starting position and the terminating position of the joystick knob in sequence for shifting. Also, in this sort of operation control device, there is known an operation control device in which when operating the joystick knob from the starting position to the terminating position, in order to determine each of one or more selective positions located between the starting position and the terminating position as well as in order to make a feeling favorable when the joystick knob is operated, a given resistance force is imparted to the joystick knob every time the joystick knob shifts to the selective position.

In addition to this, of the operation control devices, there is also known a so-called operation control device for character selection in which different characters and symbols are allotted to a plurality of selective positions respectively where an operation using the joystick knob can be performed, and when the joystick knob is operated at any of the selective positions, a character allotted to the selective position is selected.

FIG. 3 is a block diagram showing an example of structure of the principal portion of the known operation control device for character selection.

As shown in FIG. 3, this operation control device for character selection includes: a manually-operating unit 31 equipped with a joystick knob 31a operable in an X-direction and a Y-direction which cross at right angles; a first knob displacement detector 32a combined with the base of the joystick knob 31a, for detecting an amount of displacement and direction of displacement of the joystick knob 31a in the X-direction to generate knob displacement information in the X-direction corresponding to the detection result; a second knob displacement detector 32b for detecting an amount of displacement and direction of displacement of the joystick knob 31a in the Y-direction to generate knob displacement information in the Y-direction corresponding to the detection result; a displacement amount operating unit 33a for operating an amount of displacement of knob operation in the X-direction and in the Y-direction separately through the use of X-direction knob displacement information and Y-direction knob displacement information which have been supplied; a force amount operating unit 33b for operating an amount of digital force in the X-direction and in the Y-direction separately through the use of the amount of displacement of knob operation obtained by the displacement amount operating unit 33a; a controller (CPU) 33 equipped with an internal memory 33c for temporarily storing knob position information and the like when the operation of the amount of displacement of knob operation and the amount of force is set; a digital-to-analog converter (D/A converter) 34 for converting the amounts of digital force in the X-direction and in the Y-direction separately determined by the force amount operating unit 33b into amounts of analog force in the X-direction and in the Y-direction respectively; a power amplifier 35 for power-amplifying amounts of analog force in the X-direction and the Y-direction obtained by the digital-to-analog converter 34; and motors 36a and 36b whose driving shafts (no drawing No.) are combined with the joystick knob 31a through a gear mechanism (not shown), for respectively imparting forces based on the amounts of analog force in the X-direction and in the Y-direction to be supplied to the operation of the joystick knob 31a in the X-direction and in the Y-direction.

FIG. 4 is an explanatory view showing an example when indicating characters to be allotted to the operation control device for character selection shown in FIG. 3, indicating an example in which character arrangement mainly consists of the Japanese syllabary characters.

As shown in FIG. 4, a horizontal arrangement character group, for example, each character group of「あ」,「か」,「さ」,「た」,「な」,「は」,「ま」,「や」,「ら」,「わ」,「 "」, in the first row is selected at their respective selective positions when the joystick knob 31a is operated in the X-direction, and each horizontal arrangement character in the second to fifth rows is also identical. On the other hand, a vertical arrangement character group, for example, each character group of「あ」,「い」,「う」,「え」,「お」, in the first column is selected at their selective positions when the joystick knob 31a is operated in the Y-direction and each vertical arrangement character in the second to eleventh columns is also identical. Specifically, if the joystick knob 31a is operated in the X-direction to select each character group in the fourth column,「た」,「ち」,「つ」,「て」,「と」, and the joystick knob 31a is operated in the Y-direction to select each character group in the third row,「う」,「く」,「す」,「つ」,「ぬ」,「ふ」,「む」,「ゆ」,「る」,「ん」,「 -」, the character「つ」selected in both operations is selected. Also, even when other characters than「つ」are selected, the selective positions of the joystick knob 31a in the X-direction and in the Y-direction are only different, and the same selection is performed.

Further, FIG. 5A, FIG. 5B and FIG. 5C are explanatory views showing a state in which, in the operation control device for character selection shown in FIG. 3, a force is imparted to the joystick knob 31a during an operation thereof, and FIG. 5A shows a force pattern and FIGS. 5B and 5C, an operator's feeling of operation.

In FIGS. 5A, 5B and 5C, the abscissa indicates an operating position of the joystick knob 31a in one direction, for example, in the X-direction, and the ordinate indicates a state of a force to be imparted to the joystick knob 31a. The "−" symbol in FIG. 5A represents a resistance force imparted to the joystick knob 31a when the joystick knob 31a is operated in a direction from the character 51 to the character 54 which will be described later while the "+" symbol represents a driving force imparted to the joystick knob 31a when the joystick knob 31a is operated in a direction from the character 51 to the character 54. Conversely when operating in a direction from the character 54 to the character 51, the resistance force imparted is changed to the driving force imparted, and the driving force imparted is changed to the resistance force imparted. The downward portions of triangles in FIGS. 5B and 5C indicate images of the force that the operator feels when operating the joystick knob 31*a*, and represent the driving force and the resistance force respectively. In this case, a feeling of operation due to an operation in a direction from the character 51 to the character 54 becomes the same as that due to an operation in a direction from the character 54 to the character 51. Also, 51, 52, 53 and 54 represent characters allotted to selective positions respectively when the joystick knob 31*a* is operated.

The operation control device for character selection constructed as described above operates as follows.

When the joystick knob 31*a* of the manually-operating unit 31 is operated in the X-direction and in the Y-direction to operate the operating position of the joystick knob 31*a* to a desired selective position, the first knob displacement detector 32*a* detects an amount of displacement and a direction of displacement of the joystick knob 31*a* in the X-direction, and generates X-direction knob displacement information corresponding to the detection result. At the same time, the second knob displacement detector 32*b* detects an amount of displacement and a direction of displacement of the joystick knob 31*a* in the Y-direction, and generates Y-direction knob displacement information corresponding to the detection result. Thus, the X-direction knob displacement information and the Y-direction knob displacement information which have been generated are supplied to the displacement amount operating unit 33*a* of the controller 33. The displacement amount operating unit 33*a* operates amounts of knob displacement in the X-direction and in the Y-direction separately through the use of the X-direction and Y-direction knob displacement information supplied to supply the X-direction and Y-direction amounts of knob displacement thus separately obtained to the force amount operating unit 33*b*. The force amount operating unit 33*b* operates amounts of digital force in the X-direction and in the Y-direction separately through the use of the amount of knob displacement supplied to supply the X-direction and Y-direction amounts of digital force thus separately obtained to the digital-to-analog converter 34. The digital-to-analog converter 34 converts the amounts of digital force supplied into an amount of analog force in the X-direction and in the Y-direction separately to supply the X-direction and Y-direction amounts of analog force obtained to the power amplifier 35. The power amplifier 35 power-amplifies the X-direction and Y-direction amounts of analog force supplied so as to raise it to a predetermined power level, and supplies these amounts of analog force thus amplified to the motors 36*a* and 36*b* corresponding thereto. When the X-direction amount of analog force is supplied, the motor 36*a* imparts such a resistance force and a driving force as shown in FIG. 5A to the joystick knob 31*a* under operation in the X-direction, whereby such a feeling of operation as shown in FIGS. 5B and 5C is given to the operator. Similarly, when the Y-direction amount of analog force is supplied, the motor 36*b* imparts such a resistance force and a driving force as shown in FIG. 5A to the joystick knob 31*a* under operation in the Y-direction, whereby such a feeling of operation as shown in FIGS. 5B and 5C is given.

In this case, when the joystick knob 31*a* is operated until the operating position thereof reaches a desired selective position to operate an operating switch (not shown) or the like at that selective position, a character allotted to the selective position is selected, and the selected character is indicated within a blank framework provided in the upper portion of the character arrangement of the Japanese syllabary shown in FIG. 4. Next, when the joystick knob 31*a* is operated until the operating position reaches a desired selective position to operate an operating switch or the like at that selective position, a character allotted to the selective position is selected, and the selected character is indicated next to the former character indicated within the blank framework. Hereafter, the character is also selected in sequence in the same manner to indicate the character selected within the blank framework. When all the characters have been selected and a desired character string has been obtained, the joystick knob 31*a* is operated until the operating position thereof reaches a selective position where a character "Completed" shown in FIG. 4 is indicated, and when the operating switch or the like is operated at the selective position, the desired character string is transferred to a necessary position for the operation control device for character selection, and it becomes possible to select a new character string again.

In the above-described known operation control device for character selection, in the case where the joystick knob 31*a* is operated from the starting selective position to a desired terminating selective position in the X-direction and in the Y-direction, if the starting selective position is close to the terminating selective position, when the joystick knob 31*a* is operated to the terminating selective position, due to a fixed resistance force to be imparted at the selective position, it is possible to stop the operation of the joystick knob 31*a* at the selective position because an operating force to be applied to the joystick knob 31*a* during the operation of the joystick knob 31*a* is low. However, if the starting selective position is away from the terminating selective position, an operation due to a comparatively high operating force is performed so as to ignore a resistance force at a selective position on the way during the operation of the joystick knob 31*a*. Therefore, the operating force to be applied to the joystick knob 31*a* becomes great, and when the joystick knob 31*a* is operated to a desired terminating selective position, the operating force to be applied is greater than a fixed resistance force to be imparted at the selective position, whereby the operation of the joystick knob 31*a* often fails to stop at the selective position and the joystick knob 31*a* is operated to a selective position where it goes too far. Thus, in the case where such going too far from the desired terminating selective position frequently occurs during the operation of the joystick knob 31*a*, it becomes necessary to return the joystick knob 31*a* to the normal desired terminating selective position every time the going too far occurs, and the character selection efficiency of the operation control device for character selection will be deteriorated as much.

SUMMARY OF THE INVENTION

The present invention has been achieved in views of such technical background, and is aimed to provide an operation control device in which when operating an amount of force through the use of knob displacement information, a resistance force to the joystick knob is increased in sequence every time the operation of the joystick knob passes through the selective position, capable of securely stopping at the terminating selective position at all times during the operation of the joystick.

In order to achieve the above-described object, there is provided an operation control device according to the present invention, comprising: a manually-operating unit having a joystick knob operable at least in one direction; a knob displacement detector for detecting an operating state of the joystick knob to generate knob displacement information; a controller for converting an amount of knob displacement obtained from the knob displacement information into an amount of force for setting; and a force imparting unit for imparting a resistance force corresponding to the amount of force to the joystick knob during an operation of the joystick knob, wherein the controller has means which has been set in such a manner when the joystick knob passes through one or more selective positions in stages from a starting position to be operated to a terminating position, the amount of force at one or more selective positions is increased in stages as it goes from the starting position side toward the terminating position side.

According to the above-described means, since, when the joystick knob passes through one or more selective positions in stages from the starting position to be operated to the terminating position, setting has been made in such a manner that the resistance force to be imparted to the joystick knob at one or more selective positions is increased in stages from the starting position toward the terminating position, when the joystick knob passes through one or more selective positions in stages from the starting position to be operated to the terminating position, the wider an interval between the starting position and the terminating position is as well as the closer the joystick knob comes to the terminating position, the greater the resistance force to be imparted at the selective position corresponding to the terminating position becomes, whereby it becomes possible to securely stop the operation of the joystick at the terminating position.

Also, in the above-described means, the joystick knob is constructed such that when different characters are allotted to respective selective positions and the joystick knob is operated at any of the selective positions, a character allotted to the selective position is selected.

If such a structure is adopted, when the joystick knob is operated in the X-direction and in the Y-direction respectively to reach the desired selective position, the character allotted to the selective position is selected in sequence, whereby it is possible to form a character string required. Therefore, when the character is selected, it is possible to securely stop at the selective position which should be selected without going beyond the selective position, whereby it is possible to obtain an operation control device with improved character selection efficiency.

Further, in the above-described means, when converting the amount of knob displacement into an amount of force, if an operating speed of the joystick knob is below a regular speed, for example, 0.005 m/sec, the controller sets an amount of force with the knob operating speed as zero. If the knob operating speed exceeds the regular speed, the controller sets the amount of force through the use of an offset operating speed obtained by deducting the regular speed from the knob operating speed. That is, there has been adopted such a structure as, in addition to the amount of force, a resistance force proportionate to the joystick knob operating speed is added in the controller.

If such a structure is adopted, when the knob operating speed is slow, the amount of force is set with the knob operating speed as zero, and when the knob operating speed is fast, the amount of force is set with the knob operating speed as the offset operating speed. Therefore, when the amount of force is set, a primary factor for instability included in the amount of force is eliminated, whereby stable force feedback system control is performed, and when operating the knob, an excellent operating feeling is obtained, and even when the mechanical frictional force when the knob is operated is small, it becomes possible to securely operate to a position where the knob operating position is defined.

BRIEF DESCRIPTION OF THE DRAWINGS

FIG. 4 is an explanatory view showing an example when characters to be allotted to the operation control device for character selection shown in FIG. 3 are indicated; and FIG. 5 is an explanatory view showing a state in which a force is imparted to a joystick knob when the joystick knob is operated in the operation control device for character selection shown in FIG. 3.

DETAILED DESCRIPTION OF THE PREFERRED EMBODIMENTS

Hereinafter, with reference to the drawings, the description will be made of embodiments of the present invention.

Figure 1:
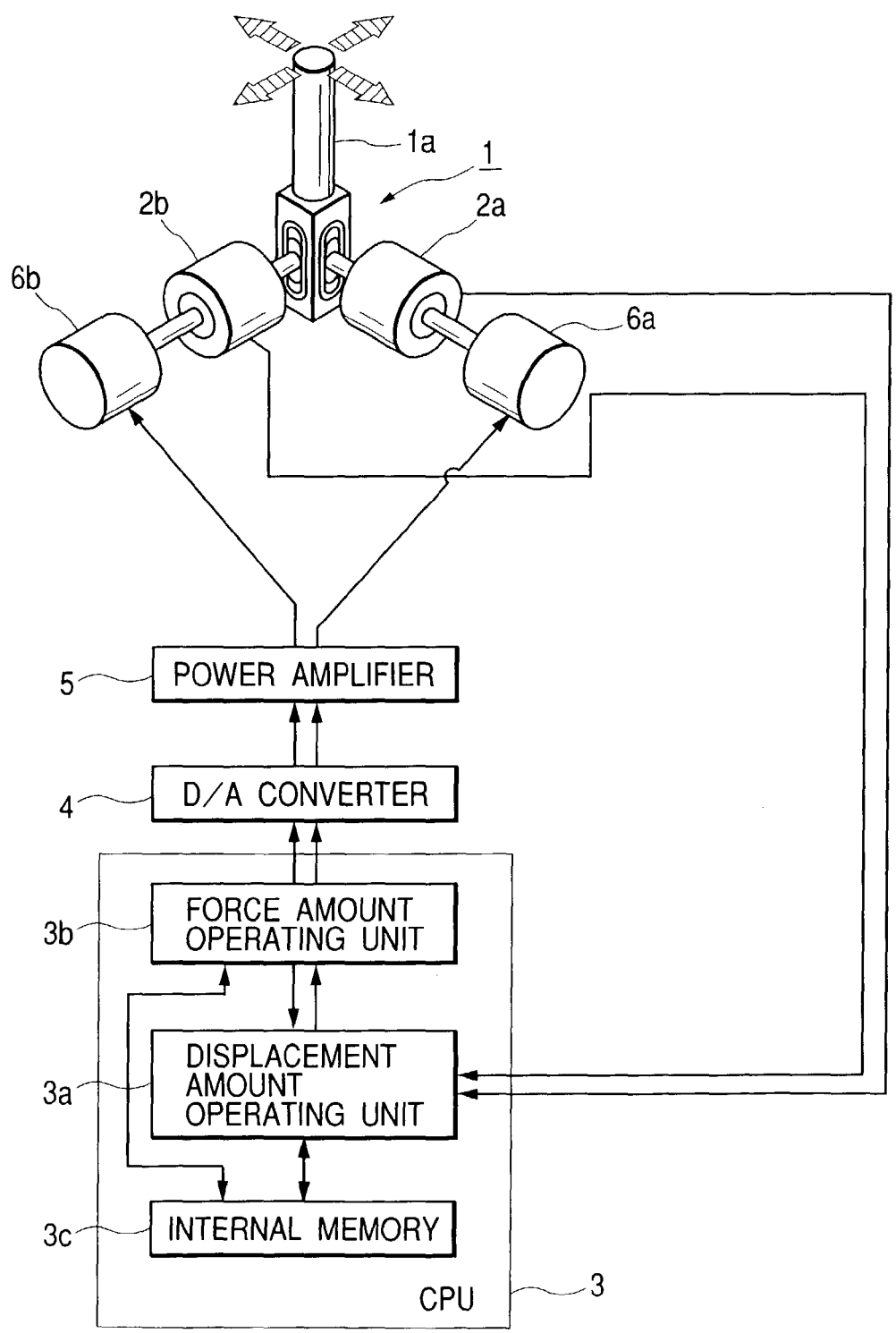
FIG. 1 is a block diagram showing partial structure of an embodiment of an operation control device according to the present invention.

FIG. 1 is a block diagram showing a partial structure of an embodiment of an operation control device according to the present invention, showing an example in which the operation control device is an operation control device for character selection.

Figure 3:
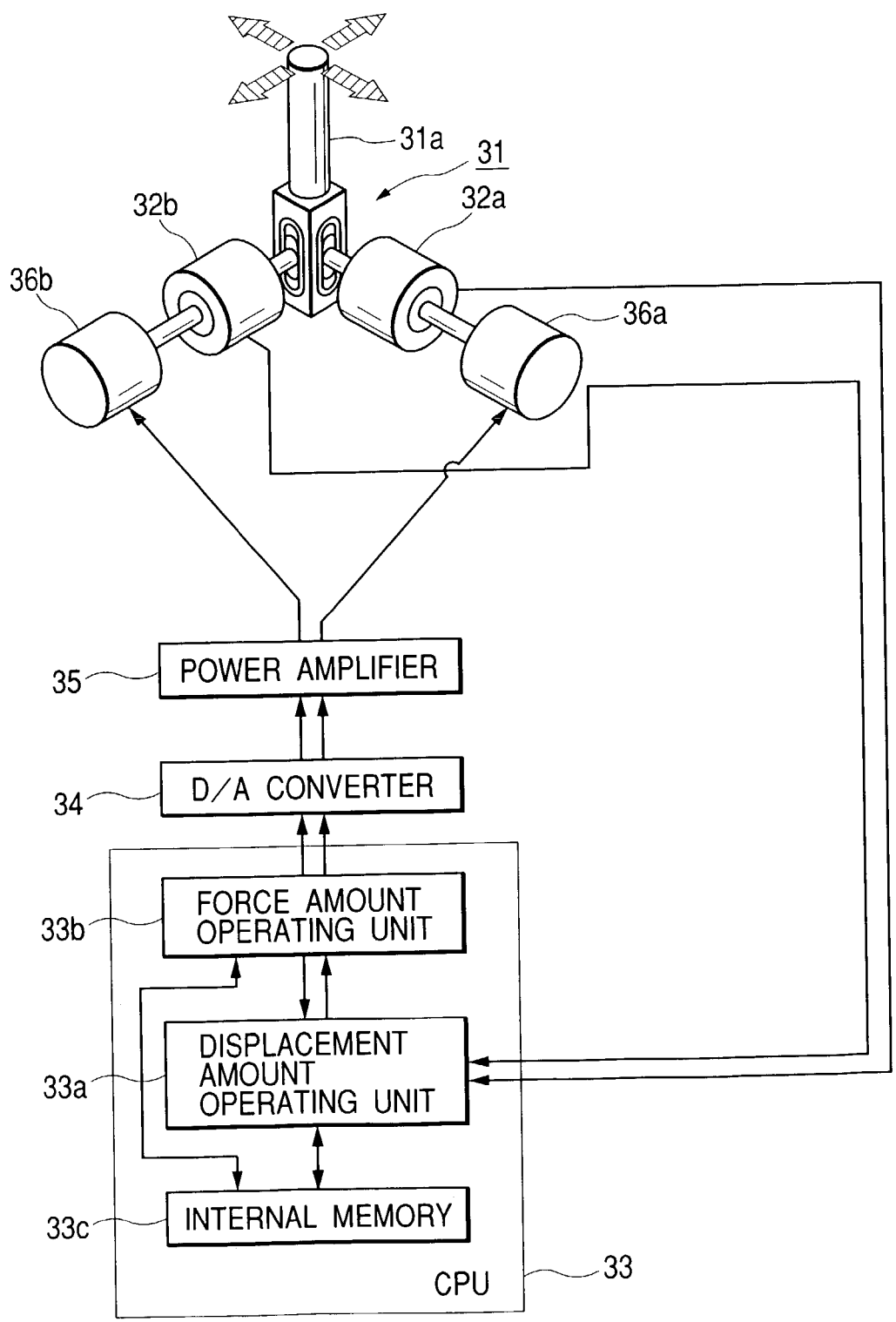
FIG. 3 is a block diagram showing an example of the partial structure of a known operation control device for character selection.

As shown in FIG. 1, an operation control device according to the present embodiment is provided with: a manually-operating unit 1 equipped with a joystick knob 1a operable in the X-direction and the Y-direction which cross at right angles; a first knob displacement detector 2a combined with the base of the joystick knob 1a, for detecting an amount of displacement and direction of displacement of the joystick knob 1a in the X-direction to generate knob displacement information in the X-direction corresponding to the detection result; a second knob displacement detector 2b for detecting an amount of displacement and a direction of displacement of the joystick knob 1a in the Y-direction to generate knob displacement information in the Y-direction corresponding to the detection result; a displacement amount operating unit 3a for operating an amount of displacement of knob operation in the X-direction and in the Y-direction separately through the use of X-direction knob displacement information and Y-direction knob displacement information which have been supplied; a force amount operating unit 3b for operating an amount of digital force in the X-direction and in the Y-direction separately through the use of the amount of displacement of knob operation obtained by the displacement amount operating unit 3a; a controller (CPU) 3 equipped with an internal memory 3c for temporarily storing knob position information and the like when the amount of displacement of knob operation and the amount of force are operated; a digital-to-analog converter (D/A converter) 4 for converting the amounts of digital force in the X-direction and in the Y-direction separately determined by the force amount operating unit 3b into amounts of analog force in the X-direction and in the Y-direction respectively; a power amplifier 5 for power-amplifying amounts of analog force in the X-direction and the Y-direction obtained by the digital/analog converter 4; and motors 6a and 6b whose driving shafts (no drawing No.) are combined with the joystick knob 1a through a gear mechanism (not shown), for respectively imparting a force based on the amount of analog force in the X-direction and in the Y-direction to be supplied to the operation of the joystick knob 1*a* in the X-direction and in the Y-direction. The operation control device apparently includes the same component elements as those of the known operation control device for character selection shown in FIG. 3.

Figure 2A:
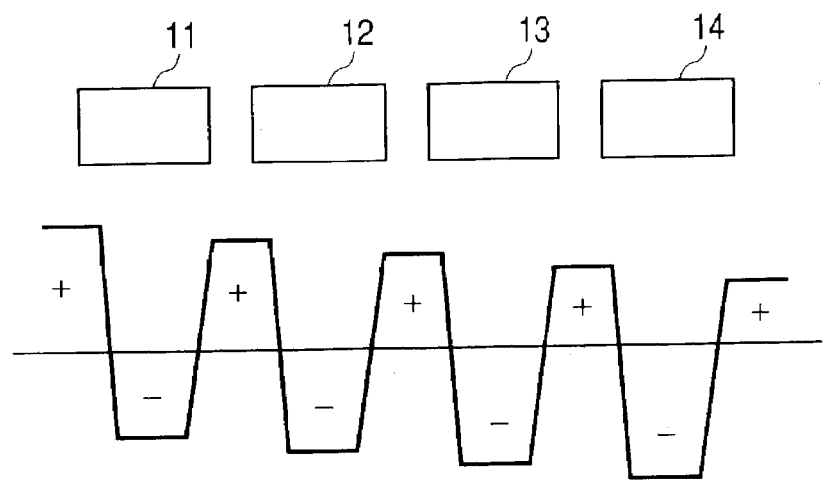
FIG. 2 is an explanatory view showing a state in which a force is imparted to a joystick knob when the joystick knob is operated in the operation control device shown in FIG. 1.
Figure 2B:
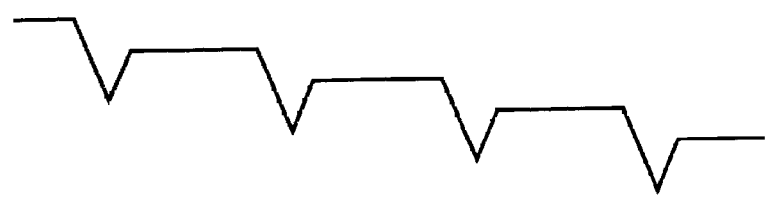
Figure 2C:
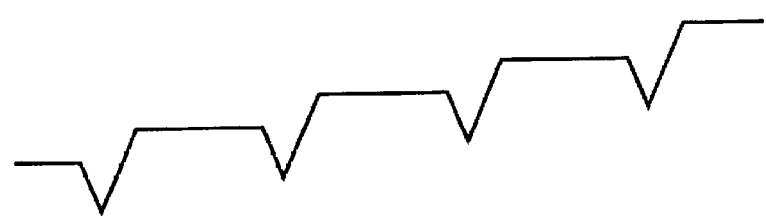

Also, FIGS. 2A, 2B and 2C are explanatory views showing a state in which a force is imparted to a joystick knob 1*a* when the joystick knob 1*a* is operated in the operation control device shown in FIG. 1, FIG. 2A indicates a force pattern, FIG. 2B indicates an operator's feeling of operation when operating in a direction from a character 14 to a character 11, and FIG. 2C indicates the operator's feeling of operation-when operating in a direction from the character 11 to the character 14, corresponding to the contents shown in FIGS. 5A to 5C.

In FIGS. 2A, 2B and 2C, the abscissa indicates an operating position of the joystick knob 1*a* in one direction, for example, in the X-direction, and the ordinate indicates a state of a force to be imparted to the joystick knob 1*a*. The "−" symbol in FIG. 2A represents a resistance force imparted to the joystick knob 1*a* when the joystick knob 1*a* is operated in a direction from the character 11 to the character 14 while the "+" symbol represents a driving force imparted to the joystick knob 1*a* when the joystick knob 1*a* is operated in a direction from the character 11 to the character 14. Conversely when operating in a direction from the character 14 to the character 11, the resistance force imparted is changed to the driving force imparted, and the driving force imparted is changed to the resistance force imparted. The downward portions of triangles in FIGS. 2B and 2C indicate images of an operating feeling due to the driving force and the resistance force that the operator feels in the vicinity of each selective position when operating the joystick knob 1*a*. Also, the characters 11, 12, 13 and 14 designate characters allotted to each selective position respectively when the joystick knob 1*a* is operated. An arrangement state of these characters 11 to 14 is a character arrangement mainly formed of the Japanese syllabary characters and the like as shown in, for example, FIG. 4.

The operation control device constructed as described above according to the present embodiment operates as follows.

When the operator operates the joystick knob 1*a* of the manually-operating unit 1 in the X-direction and in the Y-direction which cross at right angles respectively to operate the operating position of the joystick knob 1*a* to desired selective positions in the X-direction and in the Y-direction, the first knob displacement detector 2*a* detects an amount of displacement and a direction of displacement of the joystick knob 1*a* in the X-direction to generate X-direction knob displacement information corresponding to the detection result. At the same time, the second knob displacement detector 2*b* detects an amount of displacement and a direction of displacement of the joystick knob 1*a* in the Y-direction to generate Y-direction knob displacement information corresponding to the detection result for supplying the X-direction knob displacement information and the Y-direction knob displacement information which have been thus generated to the displacement amount operating unit 3*a* of the controller 3. The displacement amount operating unit 3*a* operates and sets t h e X-direction amount of knob displacement and the Y-direction amount of knob displacement respectively through the use of the X-direction knob displacement information and the Y-direction knob displacement information which have been thus supplied to supply the X-direction amount of knob displacement and the Y-direction amount of knob displacement which have been thus obtained to the force amount operating unit 3*b*. The force amount operating unit 3*b* operates the X-direction amount of force and the Y-direction amount of force through the use of the X-direction amount of knob displacement and the Y-direction amount of knob displacement which have been thus supplied to supply the X-direction amount of force and the Y-direction amount of force which have been obtained to the digital-to-analog converter 4.

At this time, the digital-to-analog converter 4 converts the X-direction amount of digital force supplied into a X-direction amount of analog force, and the Y-direction amount of digital force into the Y-direction amount of analog force respectively to supply the X-direction amount of analog force and the Y-direction amount of analog force obtained to the power amplifier 5. The power amplifier 5 power-amplifies the X-direction amount of analog force and the Y-direction amount of analog force supplied so as to reach a predetermined power level respectively to supply these amounts of analog force amplified to the motors 6*a* and 6*b* corresponding respectively.

In the case where the X-direction amount of analog force is supplied, the motor 6*a* sets the joystick knob 1*a* under operation in the X-direction when such a resistance force and a driving force as shown in FIG. 2A change, that is, the joystick knob 1*a* is operated from the starting position, for example, the position of the character 11 to the terminating position, for example, the position of the character 14 through one or more selective positions in stages, in such a manner that the resistance force to be imparted to the joystick knob 1*a* at one or more selective positions is increased in stages from the starting position toward the terminating position and that at the same time, the driving force is decreased by an amount corresponding to the increase in the resistance force, whereby such a feeling of operation as shown in FIG. 2C is given to the operator.

Similarly, when the Y-direction amount of analog force is supplied, the motor 6*b* imparts to the joystick knob 1*a* under operation in the Y-direction such resistance force and driving force as shown in FIG. 2A, whereby such a feeling of operation as shown in FIG. 2B or 2C is given.

Even in this case, when the joystick knob 1*a* is operated until its operating position shifts from the starting position to a desired selective position to operate an operating switch (not shown) or the like at the desired selective position, a character allotted to the selective position, for example, the character 14 is selected, and the selected character 14 is indicated within a blank framework provided in the upper portion of the character arrangement of the Japanese syllabary shown in FIG. 4. Next, when the operating position of the joystick knob 1*a* is operated from the present position to a next desired selective position to operate an operating switch or the like at the selective position, a character allotted at the selective position, for example, a character 13 is selected, and the selected character 13 is indicated next to the former character 14 indicated within the blank framework. Also thereafter, the joystick knob 1*a* is similarly operated until its operating position shifts to the desired selective position, and the character allotted at the selective position is selected in sequence to indicate the selected characters in sequence selected within the blank framework. Thus, when the selection of all the characters is completed to indicate the desired character string within the blank framework, the joystick knob 1*a* is operated until the operating position thereof shifts to a selective position where a character "Completed" shown in FIG. 4 is indicated. When an operating switch or the like is operated at the selective position, the desired character string is transferred to a necessary position in the operation control device, and it becomes possible to select a new character string again.

As described above, according to the operation control device according to the present embodiment, since, when the joystick knob 1a passes through one or more selective positions in stages from the starting position to be operated to the terminating position, setting has been made in such a manner that the resistance force to-be imparted to the joystick knob 1a at one or more selective positions is increased in stages from the starting position toward the terminating position, when the joystick knob 1a passes through one or more selective positions in stages from the starting position to be operated to the terminating position, the wider an interval between the starting position and the terminating position is as well as the closer the joystick knob comes to the terminating position, the greater the resistance force to be imparted to the selective position corresponding to the terminating position becomes, whereby it becomes possible to securely stop the operation of the joystick at the terminating position.

In this case, when converting the amount of displacement of the joystick knob 1a into an amount of force for setting in the displacement amount operating unit 3a and the force amount operating unit 3b, if the operating speed of the joystick knob 1a is below a regular speed, for example, 0.005 m/sec, the controller 3 sets the amount of force with the operating speed of the joystick knob 1a as zero. On the other hand, If the operating speed of the joystick knob 1a exceeds the regular speed, for example, 0.005 m/sec, the controller sets the amount of force through the use of an offset operating speed obtained by deducting the regular speed from the operating speed of the joystick knob 1a, that is, there can be adopted such a structure as a resistance force proportionate to the operating speed of the joystick knob 1a is imparted in addition to the amount of force obtained in the force amount operating unit 3b in the controller 3.

If such structure is adopted, when the operating speed of the joystick knob 1a is slow, the amount of force is set with the operating speed of the joystick knob 1a as zero, and when the operating speed of the joystick knob 1a is fast, the amount of force is set with the operating speed of the joystick knob 1a as the offset operating speed obtained by deducting the regular speed from the original operating speed of the joystick knob 1a. Thereby, when the amount of force is set, a primary factor for instability included in the amount of force is eliminated, whereby stable force feedback system control is performed, and when operating the knob, an excellent operating feeling can be obtained. Even when the mechanical frictional force when the joystick knob 1a is operated is small, it becomes possible to securely operate to a position where the operating position of the joystick knob 1a is defined.

In this respect, in the above-described embodiment, the description has been made of an example in which the operation control device is an operation control device for character selection in which when the joystick knob 1a is operated, different characters are allotted to each selective position respectively. However, it goes without saying that an operation control device according to the present invention is not limited to an operation control device for character selection and other different contents of information than characters may be allotted to each selective position respectively.

Also, in the above-described embodiment, the description has been made of an example in which the joystick knob 1a is operable in the X-direction and in the Y-direction respectively. However, a joystick knob 1a for use in the present invention is not limited to one which is operable in the X-direction and in the Y-direction respectively, and may be one which is operable in one direction or one which is operable in any other direction other than the X-direction and Y-direction.

As described above, according to the present invention, since, when the joystick knob passes through one or more selective positions in stages from the starting position to be operated to the terminating position, setting has been made in such a manner that the resistance force to be imparted to the joystick knob at one or more selective positions is increased in stages from the starting position toward the terminating position, when the joystick knob passes through one or more selective positions in stages from the starting position to be operated to the terminating position, the wider an interval between the starting position and the terminating position is as well as the closer the joystick knob comes to the terminating position, the greater the resistance force to be imparted at the selective position corresponding to the terminating position becomes, whereby there is the effect that it becomes possible to securely stop the operation of the joystick at the terminating position.

Also, according to the present invention, when the joystick knob is operated in the X-direction and in the Y-direction respectively to reach the desired selective position, the character allotted to the selective position is selected in sequence, whereby it is possible to form a character string required. Therefore, when the character is selected, it is possible to securely stop at the selective position which should be selected without going beyond the selective position, whereby there is the effect that it is possible to obtain an operation control device with character selection efficiency improved.

What is claimed is:

1. An operation control device comprising: a manual operating unit having a joystick knob operable at least in one direction; a knob displacement detector to detect an operating state of the joystick knob to generate knob displacement information; a controller to convert an amount of knob displacement obtained from the knob displacement information into an amount of force; and a force imparting unit to impart a force corresponding to the amount of force to the joystick knob during an operation of the joystick knob, wherein the controller sets the amount of force such that when the joystick knob passes through at least one selective positions in stages from a starting position to be operated to a terminating position, the amount of force at the at least one selective position is increased in stages as the joystick knob goes from a starting position side toward a terminating position side.

2. The operation control device according to claim 1, wherein when different characters and symbols are allotted to respective selective positions of the joystick knob and the joystick knob is operated at any of the selective positions, a character allotted to an intermittent position thereof is selected.

3. The operation control device according to claim 1, wherein when converting the amount of knob displacement into the amount of force, if an operating speed of the joystick knob is below a regular speed, the controller sets an amount of force with the knob operating speed as zero, and if the knob operating speed exceeds the regular speed, the controller sets the amount of force through the use of an offset operating speed obtained by deducting the regular speed from the knob operating speed.

* * * * *